(12) United States Patent
Feng et al.

(10) Patent No.: US 12,739,176 B2
(45) Date of Patent: Sep. 15, 2026

(54) COMPUTATION OFFLOADING METHOD AND DEVICE FOR INTEGRATED SENSING AND COMMUNICATION

(71) Applicant: BEIJING UNIVERSITY OF POSTS AND TELECOMMUNICATIONS, Beijing (CN)

(72) Inventors: Zhiyong Feng, Beijing (CN); Heng Yang, Beijing (CN); Zhiqing Wei, Beijing (CN); Ping Zhang, Beijing (CN); Xu Chen, Beijing (CN); Yiheng Li, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 827 days.

(21) Appl. No.: 18/175,464

(22) Filed: Feb. 27, 2023

(65) Prior Publication Data

US 2023/0275813 A1 Aug. 31, 2023

(30) Foreign Application Priority Data

Feb. 28, 2022 (CN) ......................... 202210186961.0

(51) Int. Cl.
*H04B 17/345* (2015.01)
*H04B 17/391* (2015.01)
*H04L 41/16* (2022.01)

(52) U.S. Cl.
CPC ........... *H04L 41/16* (2013.01); *H04B 17/345* (2015.01); *H04B 17/391* (2015.01)

(58) Field of Classification Search
CPC ............. G06F 9/5088; G06F 2209/502; H04B 17/318; H04B 17/345; H04B 17/391;
(Continued)

(56) References Cited

U.S. PATENT DOCUMENTS

2005/0254457 A1* 11/2005 Jung ..................... H04L 1/0003 370/328
2022/0038157 A1* 2/2022 Ali ....................... H04B 7/0639
2022/0116456 A1* 4/2022 Higuchi ................ G06F 9/5044

FOREIGN PATENT DOCUMENTS

CN 110928691 A 3/2020
CN 113504987 A 10/2021
(Continued)

OTHER PUBLICATIONS

First Office Action for Chinese Application No. 202210186961.0 mailed on Feb. 27, 2025.
(Continued)

*Primary Examiner* — Asad M Nawaz
*Assistant Examiner* — Natali Pascual Peguero
(74) *Attorney, Agent, or Firm* — Sheppard Mullin Richter & Hampton LLP

(57) ABSTRACT

A computation offloading method includes: establishing an associated model of a terminal for computation offloading; training the associated model by taking a to-be-computed task of the terminal, an uplink communication channel gain, a sensing pulse response and an angle difference between a communication beam and a sensing beam as input, to obtain an offloading parameter of the terminal for the to-be-computed task, wherein the to-be-computed task comprises to-be-computed communication data and to-be-computed sensing data, and the offloading parameter comprises a decision for offloading a computing task and a decision for offloading radio frequency transmission power; and offloading the to-be-computed task to an edge side according to the offloading parameter.

8 Claims, 3 Drawing Sheets

(58) Field of Classification Search
CPC .. H04B 7/0617; H04L 41/16; H04W 28/0925; H04W 28/0933; H04W 28/0958; H04W 24/02; Y02D 30/70
See application file for complete search history.

(56) References Cited

FOREIGN PATENT DOCUMENTS

| | | | | |
|---|---|---|---|---|
| CN | 113760511 | A | | 12/2021 |
| CN | 114281544 | A | * | 4/2022 |
| WO | 2015198156 | A1 | | 12/2015 |

OTHER PUBLICATIONS

He et al., "Energy-Aware Collaborative Computation Offloading Over Mobile Edge Computation Empowered Fiber-Wireless Access Networks", IEE Access, vol. 8, Jan. 24, 2020.
Yang et al., "Intelligent Computation Offloading for Joint Communication and Sensing-Based Vehicular Networks", IEEE Transactions on Wireless Communications, vol. 23, No. 4, Apr. 2024.
Zhang et al., "Optimization of Lightweight Task Offloading for Multi-user Mobile Edge Computing", Journal of Chinese Computer Systems, vol. 41 No. 10, Oct. 2020. English abstract provided.

* cited by examiner

COMPUTATION OFFLOADING METHOD AND DEVICE FOR INTEGRATED SENSING AND COMMUNICATION

CROSS-REFERENCE TO RELATED APPLICATIONS

This application is based on and claims priority to Chinese Patent Application No. 202210186961.0, filed on Feb. 28, 2022. The entire content of the above-referenced application is incorporated herein by reference.

TECHNICAL FIELD

The invention relates to the field of communication technology, in particular to a computation offloading method and device for integrated sensing and communication.

BACKGROUND

The high frequency band used by wireless communication networks is gradually approaching or even overlapping with the radio sensing frequency band. In different scenarios (such as smart transportation and smart factory), the integrated sensing and communication technology has been introduced, which enables the wireless network to provide a high-precision positioning service while realizing the wireless communication function, and effectively improve the resource utilization rate and information processing efficiency. In addition, with the continuous evolution of new services such as automatic driving and immersive reality extension, it is impossible to process massive data in a short time due to the limitation of terminal computing capacity. Therefore, mobile edge computing technology emerges as the times require, and the terminal can offload computing tasks to the mobile edge through the uplink communication beam, effectively reducing the energy consumption of the terminal. However, the sensing beam of the terminal and the communication beam are interfered with each other. Meanwhile, due to the mobility of the terminal equipment and high dynamic change of the conditions of the communication channel and the sensing channel, it is difficult to realize the computation offloading in the integrated sensing and communication technology.

SUMMARY

The object of the present invention is to provide a computation offloading method and device for integrated sensing and communication, which can solve the problem that the sensing beam of the terminal and the communication beam are interfered with each other, meanwhile, due to the mobility of the terminal and high dynamic change of the conditions of the communication channel and the sensing channel, it is difficult to realize the computation offloading in the integrated sensing and communication technology.

To achieve the above object, an embodiment of the invention provides a computation offloading method for integrated sensing and communication, including:

- establishing an associated model of a terminal for computation offloading;
- training the associated model by taking a to-be-computed task of the terminal, an uplink communication channel gain, a sensing pulse response and an angle difference between a communication beam and a sensing beam as input, to obtain an offloading parameter of the terminal for the to-be-computed task, wherein the to-be-computed task comprises to-be-computed communication data and to-be-computed sensing data, and the offloading parameter comprises a decision for offloading a computing task and a decision for offloading radio frequency transmission power;
- offloading the to-be-computed task to an edge side according to the offloading parameter.

Further, the associated model includes:

- an inter beam interference model, a sensing model, an uplink communication model of the terminal, a task model of the to-be-computed task, a computing model of the terminal and a computing model of the edge side.

Further, the inter beam interference model is a sector antenna model for characterizing a beam interference gain between the communication beam and the sensing beam.

Further, the sensing model of the terminal includes:

- a model for an orthogonal frequency division multiplexing sensing signal transmitted by the terminal and a model for an echo signal received by the edge side, and an output of the sensing model is conditional mutual information between a target pulse response and the received signal.

Further, the uplink communication model of the terminal is used to characterize an uplink transmission rate and the uplink communication channel gain between the terminal and the edge side.

Further, the task model is used to characterize the number of to-be-computed tasks within a preset time period, a size of each to-be-computed task, the number of CPU cycles required to execute one bit of the to-be-computed task, and a time delay threshold of each to-be-computed task.

Further, the computing model of the terminal is used to characterize a time delay of the terminal for processing the to-be-computed task and a sensing performance of the terminal.

Further, the computing model of the edge side is used to characterize a time delay of the edge side for processing the to-be-computed task and a sensing performance of the terminal;

wherein the time delay of the edge side for processing the to-be-computed task includes: a first time delay for transmitting the to-be-computed task from the terminal to the edge side, a second time delay for the edge side processing the to-be-computed task, and a third time delay for the edge side transmitting the processed to-be-computed task to the terminal.

Further, the associated model also includes a combined optimization model;

the combined optimization model is an optimization model for processing a time delay of the to-be-computed task and a sensing performance of the terminal;

the combined optimization model includes: a constraint on a total delay of operating the task, a constraint on the sensing performance of the terminal, a constraint on the radio frequency transmission power of the communication beam of the terminal, a constraint on the radio frequency transmission power of the sensing beam of the terminal, a constraint on a relationship between the sensing beam and the communication beam, and a constraint on the offloading parameter.

Further, training the associated model to obtain an offloading parameter of the terminal for the to-be-computed task comprises:

- taking the to-be-computed task of the terminal, the uplink communication channel gain, the sensing pulse response and the angle difference between the communication beam and the sensing beam as a state space, taking the decision for offloading the computing task and the decision for offloading the radio frequency transmission power as an action space, and establishing a reward function to obtain the offloading parameter;

taking the to-be-computed task of the terminal, the uplink communication channel gain, the sensing pulse response, the angle difference between the communication beam and the sensing beam and the reward function as input, through a reinforcement learning module based on Multi-DQN, to obtain the decision for computation offloading in a task offloading strategy;

taking the to-be-computed task of the terminal, the uplink communication channel gain, the sensing pulse response, the angle difference between the communication beam and the sensing beam and the reward function as input, through a reinforcement learning module based on TD3, to obtain the decision for radio frequency transmission power in the task offloading strategy.

The above technical solutions of the invention have the following beneficial effects:

The computation offloading method for integrated sensing and communication in the embodiments of the invention, through establishing an associated model of a terminal for computation offloading; training the associated model by taking a to-be-computed task of the terminal, an uplink communication channel gain, a sensing pulse response and an angle difference between a communication beam and a sensing beam as input, to obtain an offloading parameter of the terminal for the to-be-computed task, wherein the to-be-computed task comprises to-be-computed communication data and to-be-computed sensing data, and the offloading parameter comprises a decision for offloading a computing task and a decision for offloading radio frequency transmission power; and offloading the to-be-computed task to an edge side according to the offloading parameter, which can ensure that the terminal processes the communication data and the sensing data in a timely manner while reducing the data processing pressure and energy consumption of the terminal.

DETAILED DESCRIPTION

For clarity, the technical problems to be solved by the invention, technical solutions and advantages will be described in detail in combination with the drawings and specific embodiments in the following.

It is understood that "an embodiment" or "one embodiment" mentioned throughout the description means that specific features, structures or characteristics related to embodiments are included in at least one embodiment of the invention. Therefore, the expressions "in an embodiment" or "in one embodiment" mentioned throughout the description may not necessarily refer to the same embodiment. Furthermore, these specific features, structures or characteristics may be combined in one or more embodiments in any suitable manner.

In various embodiments of the invention, it is understood that the serial numbers of the following processes do not mean the sequence execution, and the execution sequence of respective processes should be determined by its function and internal logic, without any limit on the implementation process of the embodiments of the invention.

In addition, the terms "system" and "network" herein are often used interchangeably.

In the embodiments of the present application, it is understood that the expression "B corresponding to A" means that B is associated with A, and B can be determined according to A. However, it is also understood that determining B according to A does not mean determining B only according to A, B may also be determined according to A and/or other information.

Figure 1:
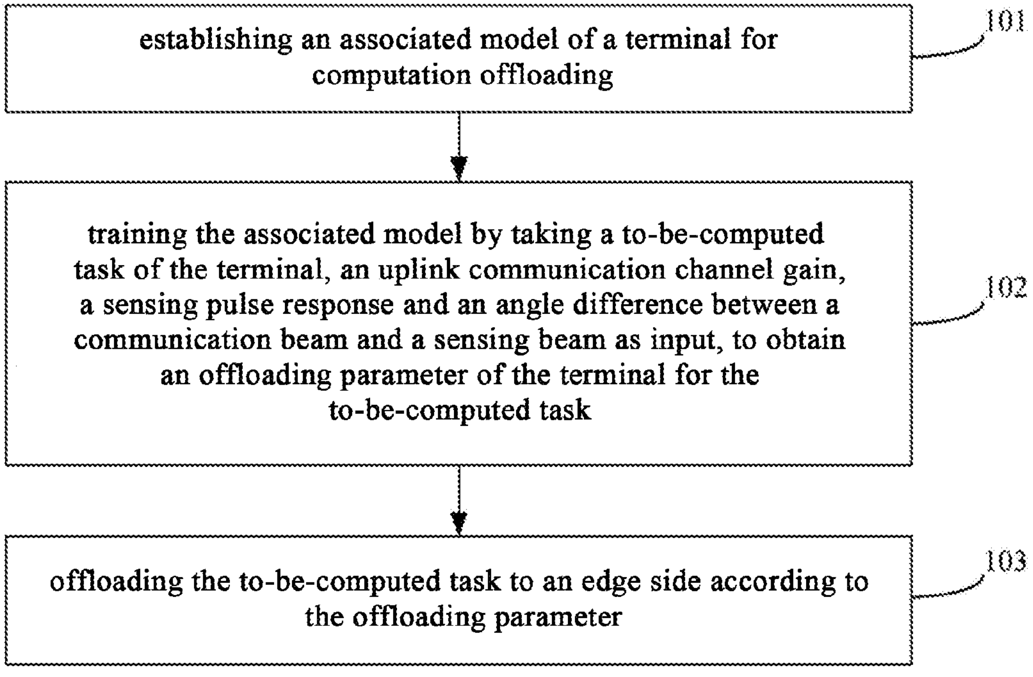
FIG. 1 is a schematic view of the computation offloading method for integrated sensing and communication according to an embodiment of the present invention.

FIG. 1 shows a computation offloading method for integrated sensing and communication according to an embodiment of the invention, which includes the following steps:

Step 101, establishing an associated model of a terminal for computation offloading.

In some embodiments, the establishing of the associated model of the terminal for computation offloading needs to be established in a wireless network environment based on the integrated sensing and communication technology. The key elements in a wireless network environment based on the integrated sensing and communication technology are defined, that is, a terminal equipment set I=11, 1, and a time slot set K={1, 2, . . . , k}. Meanwhile, the total radio frequency transmission power of each terminal equipment is defined:

$$p_i(k) = p_i^c(k) + p_i^s(k);$$

wherein, $$p_i^c(k)$$

is an uplink communication beam transmission power of the terminal equipment i, and $$p_i^s(k)$$

is a sensing beam transmission power of the terminal equipment i. In an embodiment of the invention, the terminal equipment transmits the forward horizontal sensing beam and the uplink communication beam simultaneously during the moving process.

Step 102, training the associated model by taking a to-be-computed task of the terminal, an uplink communication channel gain, a sensing pulse response and an angle difference between a communication beam and a sensing beam as input, to obtain an offloading parameter of the terminal for the to-be-computed task, wherein the to-be-computed task comprises to-be-computed communication data and to-be-computed sensing data, and the offloading parameter comprises a decision for offloading a computing task and a decision for offloading radio frequency transmission power.

In some embodiments, the set $s_i(k)$ of to-be-computed tasks, the uplink communication channel gain $$h_i^l(k),$$

the sensing pulse response $$g_i^k(t),$$

and the angle difference $\Delta\zeta^i(k)$ between the communication beam and the sensing beam are used as input, the associated model is trained in the wireless network environment based on the integrated sensing and communication technology, and trained by the respective depth neural network and embedded algorithm through the reinforcement learning module based on Multi-DQN and the reinforcement learning module based on TD3.

In an embodiment of the present invention, the computing task offload decision includes the communication data and the sensing data that need to be offloaded to the edge side in the to-be-computed task, and also includes the communication channel and the sensing channel conditions that transmit the communication data and the sensing data to the edge side.

Step 103, offloading the to-be-computed task to an edge side according to the offloading parameter.

In an embodiment of the invention, the target to-be-computed task of the terminal which is offloaded to the edge side is determined according to the offloading parameter, and the target to-be-computed task includes to-be-computed communication data and to-be-processed sensing data; the radio frequency generation power for transmitting the target to-be-computed task is determined according to the offloading parameter.

The computation offloading method for integrated sensing and communication in the embodiment of the invention, through establishing an associated model of a terminal for computation offloading, taking the terminal's to-be-computed task, an uplink communication channel gain, a sensing pulse response and an angle difference between a communication beam and a sensing beam as inputs, training the associated model to obtain an offloading parameter of the terminal for the to-be-computed task, wherein the to-be-computed task comprises to-be-computed communication data and to-be-computed sensing data, and the offloading parameter comprises a decision for offloading a computing task and a decision for offloading radio frequency transmission power, and offloading the to-be-computed task to an edge side according to the offloading parameter, which can ensure that the terminal processes the communication data and the sensing data in a timely manner while reducing the data processing pressure and energy consumption of the terminal.

In some embodiments, the associated model includes:

an inter beam interference model, a sensing model, an uplink communication model of the terminal, a task model of the to-be-computed task, a computing model of the terminal and a computing model of the edge side.

In the computation offloading method for integrated sensing and communication in the embodiment of the present invention, an associated model of a terminal for computation offloading is established in a wireless network environment based on the integrated sensing and communication, the associated model is trained and learned, so as to obtain the offloading parameter for the to-be-computed task. The radar beam transmission power of the channel and the terminal can be dynamically adjusted according to the time-varying communication channel and sensing channel, so as to achieve an effective trade-off between the sensing accuracy at the network level and computing task processing time.

In some embodiments, the inter beam interference model is a sector antenna model for characterizing a beam interference gain between the communication beam and the sensing beam.

In an embodiment of the present invention, the inter beam interference model can be approximately expressed as a sector antenna model, that is, for the integrated sensing and communication system carried by the terminal equipment, an antenna gain at the transmitting end and an antenna gain at the receiving end can be respectively described as:

$$\begin{cases} G_{main}^{t,i}(\zeta_t^i) = \dfrac{2\pi - (2\pi - \zeta_t^i)\zeta}{\zeta_t^i} \\ G_{side}^{t,i}(\zeta_t^i) = \zeta \end{cases} \text{ and}$$

$$\begin{cases} G_{main}^{r,i}(\zeta_r^i) = \dfrac{2\pi - (2\pi - \zeta_t^i)\zeta}{\zeta_t^i} \\ G_{side}^{r,i}(\zeta_r^i) = \zeta \end{cases}$$

Wherein, $$G_{main}^{t,i}(\zeta_t^i) \text{ and } G_{main}^{r,i}(\zeta_r^i)$$

are the main lobe gains of the antenna at the transmitting end and at the receiving end respectively, $$G_{side}^{t,i}(\zeta_t^i)$$

and $$G_{side}^{r,i}(\zeta_t^i)$$

are the side lobe gains of the antenna at the transmitting end and at the receiving end respectively.

$$\zeta_t^i \text{ and } \zeta_r^i$$

are a transmitting beam width and a receiving beam width.

Figure 2:
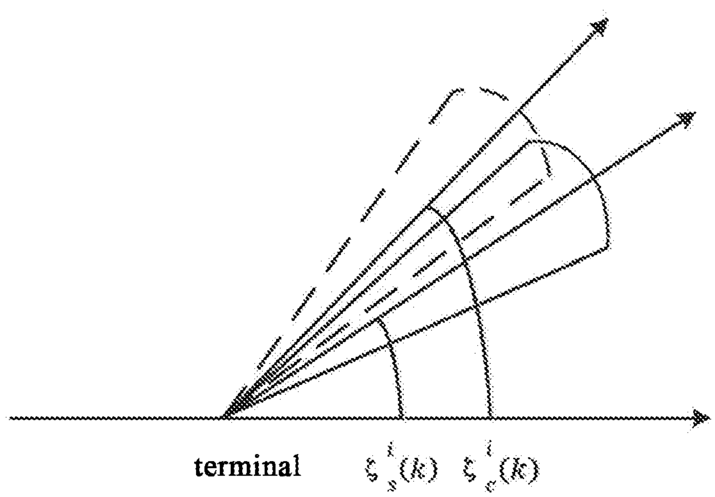
FIG. 2 is a first schematic view of the beam interference of the terminal antenna according to an embodiment of the present invention.

As shown in FIG. 2, the communication beam is indicated by the dotted line, and the sensing beam is indicated by the solid line, when $$0 \le \left|\zeta_s^i(k) - \zeta_c^i(k)\right| \le \frac{\zeta_t^i + \zeta_t^i}{2} = \zeta_t^i,$$

the inter beam interference of the antenna can be expressed as:

$$G_{ln}^{i}\left(\zeta_s^i(k), \zeta_c^i(k), \zeta_t^i\right) = \frac{G_{main}^{t,i}\left(\zeta_t^i\right)\zeta_{over} + G_{side}^{t,i}\left(\zeta_t^i\right)\left(\zeta_t^i - \zeta_{over}\right)}{\zeta_t} = \frac{2\pi - \left(2\pi - \zeta_t^i\right)\zeta}{\zeta_t^i} + \frac{2\pi(\zeta - 1)\left|\zeta_s^i(k) - \zeta_c^i(k)\right|}{\left(\zeta_t^i\right)^2}$$

$$\text{wherein } \zeta_{over}^i = \frac{\zeta_t^i + \zeta_t^i}{2} - \left|\zeta_s^i(k) - \zeta_c^i(k)\right| = \zeta_t^i - \left|\zeta_s^i(k) - \zeta_c^i(k)\right|$$

is an overlap angle between the communication beam and the sensing beam, and $$\zeta_s^i(k)$$

is an offset angle of the communication beam with respect to the horizontal direction, and $$\zeta_c^i(k)$$

is an offset angle of the sensing beam with respect to the horizontal direction. The inter beam interference is now divided into a main lobe interference and a side lobe interference.

Figure 3:
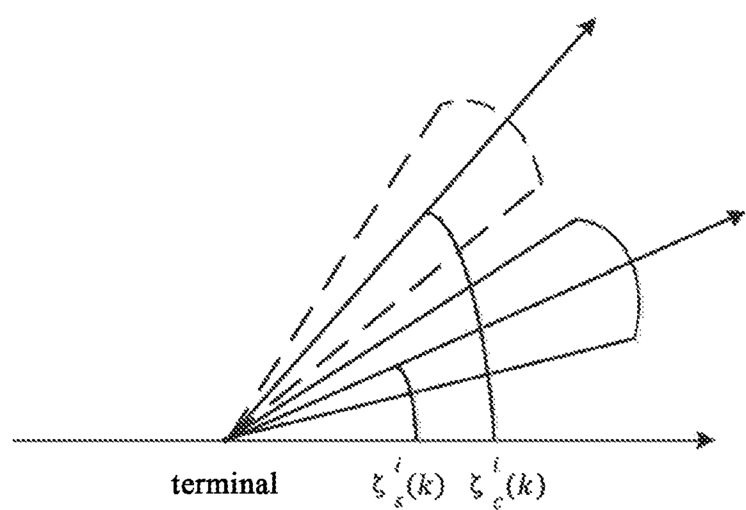
FIG. 3 is a second schematic view of beam interference of the terminal antenna according to an embodiment of the present invention.

As shown in FIG. 3, the communication beam is indicated by the dotted line, and the sensing beam is indicated by the solid line, when $$\left|\zeta_s^i(k) - \zeta_c^i(k)\right| > \frac{\zeta_t^i + \zeta_t^i}{2} = \zeta_t^i,$$

the inter beam interference of the antenna can expressed as:

$$G_{Io}^{i}\left(\zeta_s^i(k), \zeta_c^i(k), \zeta_t^i\right) = \zeta,$$

and the inter beam interference is only a side lobe interference.

The solution of the present invention dynamically adjusts the radar beam transmission power of the terminal by determining the beam interference gain between the communication beam and the sensing beam.

In some embodiments, the sensing model of the terminal includes:

- a model for an orthogonal frequency division multiplexing sensing signal transmitted by the terminal and a model for an echo signal received by the edge side, and an output of the sensing model is conditional mutual information between a target pulse response and the received signal.

In an embodiment of the present invention, the performance of radar detection is measured by the conditional mutual information between the target pulse response and the received signal, that is, the sensing performance of the terminal. The greater the conditional mutual information is, the smaller the degree of reduction of the uncertainty of the post-measurement prior is, so the parameters that measure the detected target can be accurately estimated.

The OFDM (Orthogonal Frequency Division Multiplexing) sensing signal transmitted by terminal equipment i at time slot k can be expressed as:

$$s_i^k(t) = e^{j2\pi f_c t} \sum_{j=0}^{N_s-1} \sum_{n=0}^{N_c-1} a_i^n(k) c^{n,l}(k) e^{j2\pi\Delta f(t-lT_s)} \times rect\left[(t - lT_s)/T_s\right]$$

wherein, $f_c$ is the center frequency, $N_s$ is the number of consecutive OFDM symbols sent out per time slot, $N_c$ is the number of subcarriers, and $$a_i^n(k)$$

is the amplitude of OFDM signal on the subcarrier n, $$p_i^n(k) = |a_i^n(k)|^2$$

is the amplitude of signal $$s_i^k(t)$$

on the subcarrier n. $C^{n,l}(k)$ is the phase encode of the terminal equipment i on symbol l of the subcarrier n, $T=1/\Delta F$ is the duration of the base OFDM symbol. In addition, $T_s$ is the duration of a complete symbol, and satisfies $T_s=T+T_g$, $T_g$ is a cyclic prefix, and rect $[t/T_s]$ is a rectangular function.

The sensing target pulse response $g_n(t)$ can be expressed as a Gaussian random process, so the echo signal received by the base station can be expressed as:

$$y_i^k(t) = \int_{-\infty}^{\infty} g_i^k(\tau) s^k(t - \tau) d\tau + n_i^k(t)$$

wherein, $$n_i^k(t)$$

is an additive white Gaussian noise, and the power spectral density is $$N_i^k(f).$$

At this time, for terminal equipment i, the conditional mutual information between the sensing target pulse response and the echo signal can be expressed as:

$$I\left(y_i^k(t); g_i^k(t) \,\middle|\, s_i^k(t)\right) = \frac{1}{2}\Delta f T_p \sum_{n=0}^{N_c-1} \log_2\left(1 + \frac{p_i^n(k) G_{main}^{t,i}\left(\zeta_t^i\right) G_{main}^{r,i}\left(\zeta_t^i\right) N_s T_s^2 \left|G_i^k(T_g)\right|^2 \Delta f}{T_p\left(p_i^c(k) G_{In}^{i}\left(\Delta\zeta^i(k), \zeta_t^i\right) G_{main}^{r,i}\left(\zeta_t^i\right)\left|G_i^k(f_n)\right|^2 + N_i^k(f_n)\Delta f\right.}\right)$$

wherein, $T_p=N_sT_s$ is the duration of OFDM signal, $f_n=f_c+n\Delta f$ is the frequency of the subcarrier n, $$G_i^k(f)$$

is the value of the Fourier change of $$g_i^k(t)$$

in the time slot k. Furthermore, $$\sum_{n=0}^{N_c-1} p_i^n(k) = p_i^s(k).$$

Further, the method defines the conditional mutual information (mutual information rate) per unit time as:

$$I^i(k) = \frac{I\left(y_i^k(t); g_i^k(t); s_i^k(t)\right)}{T_p} = \frac{1}{2}\Delta f \sum_{n=0}^{N_c-1} \log_2\left(1 + \frac{p_i^n(k) G_{main}^{t,i}(\zeta_t^i) G_{main}^{r,i}(\zeta_t^i) N_s T_s^2 \left|G_i^k(f_n)\right|^2 \Delta f}{T_p\left(p_i^c(k) G_{In}^i(\Delta\zeta^i(k), \zeta_t^i) G_{main}^{r,i}(\zeta_t^i)\left|G_i^k(f_n)\right|^2 + T_i^2(f_n)\Delta f\right)}\right)$$

The scheme of the invention determines the sensing performance of the terminal according to the conditional mutual information between the target pulse response and the received signal, so that the terminal can ensure the sensing performance of the terminal while ensuring the communication data transmission processing.

In some embodiments, the uplink communication model of the terminal is used to characterize an uplink transmission rate and the uplink communication channel gain between the terminal and the edge side.

In an embodiment of the present invention, the terminal equipment offloads the computing task uplink to a mobile edge server tightly coupled to the edge side base station by using orthogonal frequency division multiple accesses. According to Shannon's formula, the uplink transmission rate of the terminal equipment i and the edge side base station can be expressed as:

$$r_i^I(k) = B\log_2\left(1 + \frac{p_i^c(k) G_{main}^{t,i}(\zeta_t^i) G_{main}^{r,R}(\zeta_t^R) h_i^I(k)}{p_i^s(k) G_{In}^i(\Delta\zeta^i(k), \zeta_t^i) G_{main}^{r,R}(\zeta_t^R) h_i^I(k) + \sigma^I(k)^2}\right)$$

wherein, B is the uplink bandwidth allocated to each terminal equipment, $\sigma^2$ is the noise power of the communication channel, $$h_i^I(k)$$

is the time-varying communication channel gain. In addition, $$G_{main}^{r,R}(\zeta_t^R)$$

is the antenna main lobe gain of the edge side base station, which can be expressed as:

$$G_{main}^{r,R}(\zeta_r^R) = \frac{2\pi - (2\pi - \zeta_r^R)\zeta}{\zeta_r^R}$$

Wherein, $$\zeta_r^R$$

is the beam width of the edge side base station receiver, and the path loss (dB) between the terminal equipment i and the edge side base station is:

$$L(d_i(k))=40(1-4\times10^{-3}D^{hb})\log_{10}d_i(k)-18\log_{10}D^{hb}+21\log_{10}f(k)+80$$

Where, f(k) is the carrier frequency and $D^{hb}$ is the height of the antenna. At this time, the uplink communication channel gain is:

$$h_i^1(k) = 10^{-L(d_i(k))/10}$$

In an embodiment of the present invention, the channel information of the communication data and the sensing data can be randomly assigned through a function that can be a random function and a Gaussian function.

In some embodiments, the task model is used to characterize the number of to-be-computed tasks within a preset time period, a size of each to-be-computed task, the number of CPU cycles required to execute one bit of to-be-computed tasks, and a time delay threshold of each to-be-computed task.

In an embodiment of the present invention, each terminal has a batch of tasks (such as original sensing information to be processed) that need to be processed at time slot k. At this time, the batch of tasks can be further described as a triplet $$L_i(k) = \{s_i(k), c_i(k), \varpi_i^{max}(k)\}.$$

$S_i(k)=n_i(k)l_i(k)$ is the size of these tasks, $n_i(k)$ is the number of tasks to be processed at time slot k, $l_i(k)$ is the size of each task, $c_i(k)$ is the number of CPU cycles required to execute one bit of tasks, and $$\varpi_i^{max}(k)$$

is the maximum time delay that can be tolerated to process these tasks.

In an embodiment of the present invention, all to-be-computed tasks of the terminal, the size of each to-be-computed task, the number of CPU cycles required to execute one bit of the to-be-computed task, and the time delay threshold of each to-be-computed task are obtained, and then the target to-be-computed task that needs to be offloaded to the edge side is determined according to the computing power of the terminal.

In some embodiments, the computing model of the terminal is used to characterize a time delay of the terminal for processing the to-be-computed task and a sensing performance of the terminal.

In addition, $\beta_i(k)$ is the computation offloading decision factor, when $\beta_i(k)=1$, the computing task is offloaded to the mobile edge server for processing, and when $\beta_i(k)=0$, the task is processed at the terminal equipment side. At time slot k, all to-be-computed tasks are processed at the terminal, and the computing model of terminal equipment i ($\beta_i(k)=0$) is mainly composed of one stage: the local server on the terminal equipment processes the computing tasks. The processing time delay of the computing tasks on the terminal equipment is:

$$\tau_i^L(k) = \frac{s_i(k)c_i(k)}{f_i^L(k)} = \frac{n_i(k)l_i(k)c_i(k)}{f_i^L(k)}$$

wherein $$f_i^L(k)$$

is the CPU frequency of the local server (CPU cycles per second). When tasks are all processed on the local server, the radio frequency transmission power of terminal equipment i is used for sensing. At this time, the mutual information rate of terminal equipment i used to measure the sensing performance can be expressed as:

$$I_i^L(k) = \frac{1}{2}\Delta f \sum_{n=0}^{N_c-1} \log_2\left(1 + \frac{p_i^n(k)G_{main}^{t,i}(\zeta_t^i)G_{main}^{r,i}(\zeta_t^i)N_s T_s^2 \left|G_i^k(f_n)\right|^2}{T_p N_i^k(f_n)}\right)$$

wherein, $$\sum_{n=0}^{N_c-1} p_i^n(k) = p_i^s(k) = p_i(k).$$

In some embodiments, the computing model of the edge side is used to characterize a time delay of the edge side for processing the to-be-computed task and a sensing performance of the terminal;

wherein the time delay of the edge side for processing the to-be-computed task includes: a first time delay for transmitting the to-be-computed task from the terminal to the edge side, a second time delay for the edge side processing the to-be-computed task, and a third time delay for the edge side transmitting the processed to-be-computed task to the terminal.

In an embodiment of the invention, the computing model of terminal equipment i is at time slot k ($\beta_i(k)=1$) is mainly composed of three stages: the terminal equipment i uploads the computing task to the edge side base station; the computing task is processed on the mobile edge server; the processing result is sent to the terminal equipment i. At this time, the processing time delay for the computing task from the terminal equipment i is:

$$\tau_i^O(k) = \tau_i^{UPO}(k) + \tau_i^{MO}(k) + \tau_i^{DLO}(k)$$

Wherein, $$\tau_i^{UPO}(k)$$

is the uplink transmission time delay of the computing task;

$$\tau_i^{MO}(k)$$

is the processing time delay of the computing task on mobile edge server;

$$\tau_i^{DLO}(k)$$

is the downlink transmission time delay of the computing task. Since the processed result information is relatively small, the downlink transmission time delay can be ignored.

Further, the first time delay can be expressed as:

$$\tau_i^{UPO}(k) = \frac{s_i(k)}{r_i^I(k)} = \frac{n_i(k)l_i(k)}{r_i^I(k)}$$

The second time delay can be expressed as:

$$\tau_i^{MO}(k) = \frac{s_i(k)c_i(k)}{f_i^M(k)} = \frac{n_i(k)l_i(k)c_i(k)}{f_i^M(k)}$$

wherein $$f_i^M(k)$$

is the CPU frequency of the mobile edge server (CPU cycles per second). a part of the radio frequency power of terminal equipment i is used for uploading the computing task, and the other part is used for sensing. Therefore, the mutual information rate used to measure the sensing performance by the terminal equipment i can be expressed as:

$$I_i^O(k) = \frac{1}{2}\Delta f \sum_{n=0}^{N_c-1} \log_2\left(1 + \frac{p_i^n(k)G_{main}^{t,i}(\zeta_t^i)G_{main}^{r,i}(\zeta_t^i)N_s T_s^2\left|G_i^k(f_n)\right|^2}{T_p\left(p_i^c(k)G_{In}^i(\Delta\zeta^i(k), \zeta_t^i)G_{main}^{r,i}(\zeta_t^i)\left|G_i^k(f_n)\right|^2 + N_i^k(f_n)\Delta f\right)}\right)$$

wherein, $$\sum_{n=0}^{N_c-1} p_i^n(k) = p_i^s(k) = p_i(k) - p_i^C(k).$$

In some embodiments, the associated model also includes a combined optimization model;

the combined optimization model is an optimization model for processing a time delay of the to-be-computed task and a sensing performance of the terminal;

the combined optimization model includes: a constraint on a total delay of operating the task, a constraint on the sensing performance of the terminal, a constraint on the radio frequency transmission power of the communication beam of the terminal, a constraint on the radio frequency transmission power of the sensing beam of the terminal, a constraint on a relationship between the sensing beam and the communication beam, and a constraint on the offloading parameter.

The object of the embodiment of the present invention is to combined-optimize the processing delay of a computing task and the sensing performance of a terminal equipment. Therefore, the following combined optimization model is constructed:

$$\mathrm{Min}_{p_i^n(k),\beta_i(k)} \lim_{|K|} \frac{1}{|K|} \sum_{k\in K} \left( \alpha(k) \frac{\tau(k)}{\tau_{max}} + \delta(k) \left( -\frac{I(k)}{I_{max}} \right) \right);$$

$$\text{s.t. } (1-\beta_i(k))\tau_i^L(k) + \beta_i(k)\tau_i^O(k) \le \omega_i^{max}(k),\ \forall\, i \in I; \quad \text{C1}$$

$$(1-\beta_i(k))I_i^L(k) + \beta_i(k)I_i^O(k) \ge I_i^{min}(k),\ \forall\, i \in I; \quad \text{C2}$$

$$0 \le \sum_{n=0}^{N_c-1} p_i^n(k) = p_i^s(k) \le p_i(k),\ \forall\, i \in I; \quad \text{C3}$$

$$0 \le p_i^n(k) \le = p_i^{n,max} \le p_i(k),\ \forall\, i \in I,\ n \in N; \quad \text{C4}$$

$$p_i^s(k) + p_i^c(k) = p_i(k),\ \forall\, i \in I; \quad \text{C5}$$

$$\beta_i(k) \in \{0,1\},\ \forall\, i \in I. \quad \text{C6}$$

wherein, τ(k) is the total processing time delay of the computing task at the network level, which can be expressed as:

$$\tau(k) = \sum_{i\in I} \left( \beta_i(k)\tau_i^O(k) + (1-\beta_i(k))\tau_i^L(k) \right)$$

I(k) is the total mutual information rate at the network level, which can be expressed as:

$$I(k) = \sum_{i\in I} \left( \beta_i(k)I_i^O(k) + (1-\beta_i(k))I_i^L(k) \right)$$

α(k) and δ(k) are the weights of total processing time delay of the task and total mutual information rate, and α(k)+δ(k)=1. $\tau_{max}$ is the maximum total processing time delay of the task, and $I_{max}$ is the maximum mutual information rate. C1 indicates that the total task operation delay cannot exceed the maximum constraint time delay; C2 limits the minimum sensing performance of terminal equipment; C3 and C4 constrain the transmission power of the sensing beam and communication beam of the terminal equipment; C5 gives the relationship between the sensing beam and the communication beam; C6 limits the duality of offload decision variables.

In the solution of the present invention, by constructing a combined optimization model, the processing time delay of the computing task and the sensing performance of the terminal are used as optimization indicators, which obtains the offload decision and the radio frequency generation power for the to-be-computed task while ensuring the processing time delay of the task and the sensing performance of the terminal.

In some embodiments, training the associated model to obtain an offloading parameter of the terminal for the to-be-computed task includes:

- taking the to-be-computed task of the terminal, the uplink communication channel gain, the sensing pulse response and the angle difference between the communication beam and the sensing beam as a state space, taking the decision for offloading the computing task and the decision for offloading the radio frequency transmission power as an action space, and establishing a reward function to obtain the offloading parameter;
- taking the to-be-computed task of the terminal, the uplink communication channel gain, the sensing pulse response, the angle difference between the communication beam and the sensing beam and the reward function as input, through a reinforcement learning module based on Multi-DQN, to obtain the decision for computation offloading in a task offloading strategy;
- taking the to-be-computed task of the terminal, the uplink communication channel gain, the sensing pulse response, the angle difference between the communication beam and the sensing beam and the reward function as input, through a reinforcement learning module based on TD3, to obtain the decision for radio frequency transmission power in the task offloading strategy.

In an embodiment of the present invention, the optimization model is transformed into a Markov decision process to realize the data interaction with different modules. The relevant elements of the Markov decision process are as follows:

(1) State space: for each time slot k, there is a batch of computing tasks to be processed on the terminal equipment side. At the same time, since the terminal equipment moves continuously, mobility of the terminal equipment can be further mapped to the time-varying uplink communication channel, the time-varying sensing target pulse response, and the angle difference between the time-varying communication beam and the sensing beam, which is specifically described as:

$$s_k = \{ s_i(k),\ h_i^I(k),\ g_i^k(t),\ \Delta\zeta^i(k) \}$$

(2) Action space: for each time slot k, there are two types of decisions in the method, which are the computation offloading decision $\beta_i(k)$, and the transmission power decision $$p_n^i(k),$$

namely:

$$a_k = \{ \beta_i(k),\ p_n^i(k) \}$$

In order to better match the reinforcement learning module based on Multi-DQN and the reinforcement learning module based on TD3, the method further divides the action space A into $A=A_o \cup A_p$, wherein $$a_k^o = \{\beta_i(k)\} \in A_o,\ a_k^p = \{p_i^n(k)\} \in A_p.$$

(3) Reward: based on the combined optimization model, the reward of the Markov decision process can be expressed as:

$$r_t = \begin{cases} -\left(\left(\alpha(k)\frac{\tau(k)}{\tau_{max}} + \delta(k)\left(-\frac{I(k)}{I_{max}}\right)\right)\right), & \text{satisfying } C1-C3 \\ -1, & \text{others} \end{cases}$$

Figure 4:
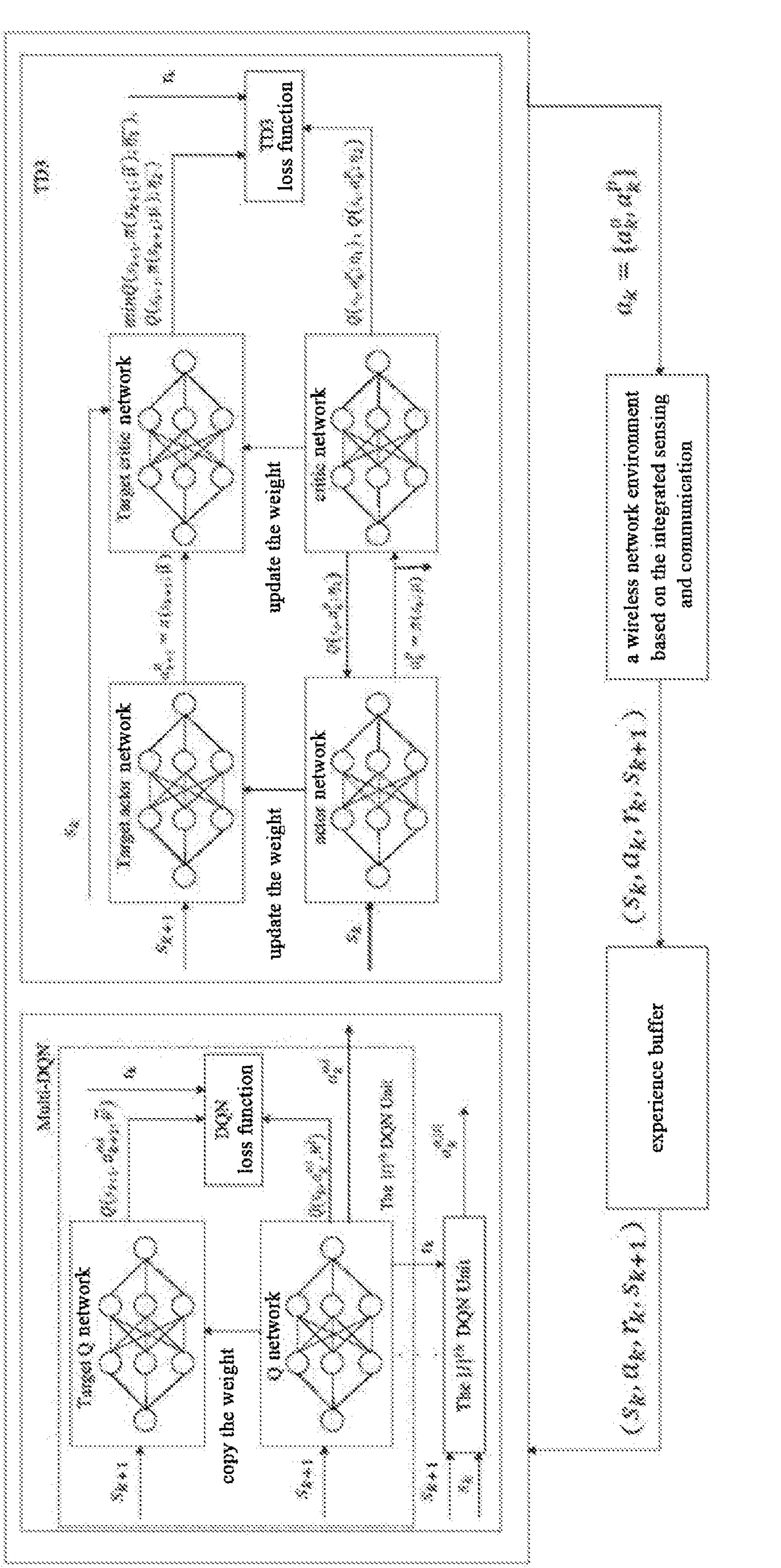
FIG. 4 is a schematic view of training and learning steps of the computation offloading method for integrated sensing and communication according to an embodiment of the present invention.

As shown in FIG. 4, in an embodiment of the present invention, the associated model in the computation offloading method for integrated sensing and communication is established in a wireless network environment based on the integrated sensing and communication. The experience buffer module is mainly used to overcome the correlation and non-stationary problems of experience data in the reinforcement learning network training. The specific operation is to store the data tuples ($s_k$, $a_k$, $r_k$, $s_{k+1}$) from the environment module in each time slot into the buffer pool, and delete the data that was first added to the buffer pool; during each training, N batches of data will be sampled.

The two-level deep reinforcement learning strategy module consists of a reinforcement learning submodule based on Multi-DQN and a reinforcement learning submodule based on TD3. As shown in FIG. 4, the two reinforcement learning modules simultaneously receive N batches of data from the experience buffer module as input, and the training is performed by using their own deep neural networks and embedded algorithms. When the model is trained, the optimal decision can be achieved.

(1) Reinforcement Learning Submodule Based on Multi-DQN

In the environment module, the action space in the Markov decision is $$a_k = \{\beta_i(k),\ p_n^i(k)\},$$

wherein, the computation offloading decision $\beta_i(k)$ is a discrete action, the module is embedded with the DQN algorithm to output the optimal computation offloading decision. In the actual wireless network based on the integrated sensing and communication, the density of the terminal equipments is large, and the action space of a single DQN network architecture will grow exponentially with the traffic flow. Therefore, in order to reduce the dimension of the action space, the module introduces the architecture of Multi-DQN, that is, the discrete actions of each terminal equipment are trained and output by a corresponding DQN network. Each DQN network uses an s-greedy strategy, i.e., randomly selecting an action from the action space with probability £, or selecting the highest Q value with probability 1-ε, which is expressed as:

$$a_k^{o,i} = \text{argmax} Q(s_k,\ a_k^{o,i},\ \theta^i)$$

wherein, εΣ(0, 1), $\theta^i$ is the weight of the i-th DQN unit, $$a_k^o = \{a_k^{o,i}\}.$$

At this time, this action together with the action output by the reinforcement learning module based on TD3 is input to the environment module, and the environment module is transferred from $s_k$ to $S_{k+1}$. Further, based on the randomly sampled data tuples ($s_k$, $a_k$, $r_k$, $s_{k+1}$) provided by the experience buffer pool, the target Q value generated by the target Q network of the i-th DQN unit is:

$$y_k = r_k + \max_{a_{k+1}^{o,i} \in A_o} Q\left(s_{k+1},\ a_{k+1}^{o,i};\ \overline{\theta^i}\right)$$

Wherein, $\overline{\theta^i}$ is the weight of the target Q network in the i-th DQN unit. At this time, the Q network in the i-th DQN unit can be trained by minimizing the following loss function:

$$L(\theta) = \left(y_k - Q\left(s_{k+1},\ a_{k+1}^{o,i};\ \theta^i\right)\right)^2$$

The weight $\overline{\theta^i}$ in the target Q network in the i-th DQN unit can be updated by copying the parameters of the Q network through every G time lots.

(2) Reinforcement Learning Submodule Based on TD3

In the environment module, the action space in the Markov decision is $$a_k = \{\beta_i(k),\ p_n^i(k)\},$$

wherein, the transmission power decision $\beta_i(k)$ is a continuous action, the module is embedded with the TD3 algorithm to output the optimal transmission power decision.

In this module, six deep neural networks are introduced, three of which are evaluation networks (one is evaluation actor network to output actions, and the other two are evaluation critic networks to evaluate Q value), and the other three are target networks (one is target actor network, and the other two are target critic networks to generate target value for respective evaluation network). μ is the weight of the evaluationactor network, $\eta1$ and $\eta2$ are the weight of evaluation critic network, $\bar{\mu}$ is the weight of target actor network, $\overline{\eta_1}$ and $\overline{\eta_2}$ are the weight of target critic network respectively.

The module uses an actor-critic approach, i.e., the evaluation actor network outputs deterministic transmission power decision $$a_k^P = \pi(s_k;\ \mu)$$

based on the deterministic policy gradient theory, and the evaluation critic network evaluates the output action. In addition, in order to explore new actions in the action space, a gaussian noise is introduced as follows:

$$a_k^P = \pi(s_k;\ \mu) + N(0,\ \psi)\Big]_0^{p_i^{n,max}}$$

At this time, this action together with the action output by the reinforcement learning module based on TD3 is input to the environment module, and the environment module is transferred from $s_k$ to $S_{k+1}$. According to $$a_k^P = \pi(s_k; \mu),$$

the two evaluation critical networks can output the respective Q value $Q(s, a, \eta_1)$ and $Q(s, a, \eta_2)$. Therefore, the weight μ can be updated according to the following formula:

$$\nabla_\mu J(\pi) = E_S[\nabla_a Q(s, a, \eta_1)|_{a=\pi(s;\mu)} \nabla_\mu \pi(s; \mu)]$$

Based on the randomly sampled data tuples $(s_k, a_k, r_k, s_{k+1})$ provided by the experience buffer, the above formula can be approximately expressed as:

$$\nabla_\mu J(\pi) \approx \frac{1}{N}\sum_k \left[\nabla_a Q(s, a, \eta_1)|_{S=s_k, a=\pi(s;\mu)} \nabla_\mu \pi(s; \mu)|_{S=s_k}\right]$$

Target Q value can be updated according to the target actor network and target critical network:

$$y_k = r_k + \gamma \min Q(s_{k+1}, \pi(s_{k+1}; \overline{\mu}); \overline{\eta_1}), Q(s_{k+1}; \overline{\mu}); \overline{\eta_2})$$

The loss functions of the two evaluation critical networks can be updated according to the following formula:

$$L(\eta_1) = \frac{1}{N}\sum_k (y_k - Q(s_k, a_k^p; \eta_1))^2$$

$$L(\eta_2) = \frac{1}{N}\sum_k (y_k - Q(s_k, a_k^p; \eta_2))^2$$

The weight $\overline{\eta_1}$, $\overline{\eta_2}$ and $\overline{\mu}$ are slowly updated to improve the stability of the training process, based on the following formula:

$$\overline{\eta_1} \leftarrow \tau\eta_1 + (1-\tau)\overline{\eta_1}$$

$$\overline{\eta_2} \leftarrow \tau\eta_2 + (1-\tau)\overline{\eta_2}$$

$$\overline{\mu} \leftarrow \tau\mu + (1-\tau)\overline{\mu}.$$

It is further noted that the terminal described in present description include, but are not limited to, a smartphone, a tablet, etc., and many functional components described are referred to as modules, so as to more specifically emphasize the independence of their implementation.

In the embodiment of the invention, modules can be implemented in software so that they can be executed by various types of processors. For example, an identified executable code module may include one or more physical or logical blocks of computer instructions. For example, it may be constructed as objects, procedures or functions. Nevertheless, the executable code of the identified module does not need to be physically located together, but can include different instructions stored in different bits, when these instructions are logically combined, they constitute a module and achieve the specified purpose of the module.

When the module can be implemented by a software, given the level of existing hardware processes, for the module that can be implemented by a software, without considering the cost, those skilled in the art can build a corresponding hardware circuit to implement the corresponding function, the hardware circuit includes a conventional Very Large Scale Integration (VLSI) circuit or a gate array and an existing semiconductor such as logic chip, transistor, etc., or other discrete element. The module can also be implemented by programmable hardware devices, such as a field programmable gate array, a programmable array logic, a programmable logic device, etc.

The above exemplary embodiments are described with reference to these figures, many different forms and embodiments are feasible without departing from the spirit and teaching of the invention, therefore, the invention should not be constructed as a limitation of the exemplary embodiments proposed herein. More specifically, these exemplary embodiments are provided to make the invention perfect and complete, and to convey the scope of the invention to those skilled in the art. In these views, the dimensions and the relative dimensions of the components may be enlarged for the sake of clarity. The terms used herein are only for the purpose of describing specific exemplary embodiments and are not intended to be restricted. As used herein, unless otherwise indicated, the singular forms "a", "an", "one" and "the" are intended to include those multiple forms. It is further understood that these terms "include" and/or "comprise", when used in present description, indicate the existence of the feature, integer, step, operation, component and/or accessory, but the existence or increase of one or more further feature, integer, step, operation, component, accessory and/or family thereof is not excluded. Unless otherwise indicated, a range of a value includes the upper and lower limits of the range and any subrange therebetween.

The above are preferred implementations of the present invention. It should be noted that those of ordinary skills in the art can make improvements and modifications without departing from the principle of the present invention, and these improvements and modifications should be considered within the protection scope of the present invention.

What is claimed is:

1. A computation offloading method for integrated sensing and communication, comprising:

establishing an associated model of a terminal for computation offloading;

training the associated model by taking a to-be-computed task of the terminal, an uplink communication channel gain, a sensing pulse response and an angle difference between a communication beam and a sensing beam as input, to obtain an offloading parameter of the terminal for the to-be-computed task, wherein the to-be-computed task comprises to-be-computed communication data and to-be-computed sensing data, and the offloading parameter comprises a decision for offloading a computing task and a decision for offloading radio frequency transmission power; and offloading the to-be-computed task to an edge side according to the offloading parameter, wherein the associated model comprises:

an inter beam interference model, a sensing model, an uplink communication model of the terminal, a task model of the to-be-computed task, a computing model of the terminal, and a computing model of the edge side, and wherein:

the associated model also includes a combined optimization model;

the combined optimization model is an optimization model for processing a time delay of the to-be-computed task and a sensing performance of the terminal; and the combined optimization model includes: a constraint on a total delay of operating the to-be-computed task, a constraint on the sensing performance of the terminal, a constraint on the radio frequency transmission power of the communication beam of the terminal, a constraint on the radio frequency transmission power of the sensing beam of the terminal, a constraint on a relationship between the sensing beam and the communication beam, and a constraint on the offloading parameter.

2. The computation offloading method for integrated sensing and communication according to claim 1, wherein the inter beam interference model is a sector antenna model for characterizing a beam interference gain between the communication beam and the sensing beam.

3. The computation offloading method for integrated sensing and communication according to claim 1, wherein the sensing model of the terminal comprises:

a model for an orthogonal frequency division multiplexing sensing signal transmitted by the terminal and a model for an echo signal received by the edge side, and an output of the sensing model is conditional mutual information between a target pulse response and the received signal.

4. The computation offloading method for integrated sensing and communication according to claim 1, wherein the uplink communication model of the terminal is used to characterize an uplink transmission rate and the uplink communication channel gain between the terminal and the edge side.

5. The computation offloading method for integrated sensing and communication according to claim 1, wherein the task model is used to characterize a number of to-be-computed tasks within a preset time period, a size of each to-be-computed task, a number of CPU cycles required to execute one bit of the to-be-computed task, and a time delay threshold of each to-be-computed task.

6. The computation offloading method for integrated sensing and communication according to claim 1, wherein the computing model of the terminal is used to characterize a time delay of the terminal for processing the to-be-computed task and the sensing performance of the terminal.

7. The computation offloading method for integrated sensing and communication according to claim 1, wherein the computing model of the edge side is used to characterize a time delay of the edge side for processing the to-be-computed task and the sensing performance of the terminal;

wherein the time delay of the edge side for processing the to-be-computed task includes: a first time delay for transmitting the to-be-computed task from the terminal to the edge side, a second time delay for the edge side processing the to-be-computed task, and a third time delay for the edge side transmitting the processed to-be-computed task to the terminal.

8. The computation offloading method for integrated sensing and communication according to claim 1, wherein training the associated model to obtain an offloading parameter of the terminal for the to-be-computed task comprises:

taking the to-be-computed task of the terminal, the uplink communication channel gain, the sensing pulse response and the angle difference between the communication beam and the sensing beam as a state space, taking the decision for offloading the computing task and the decision for offloading the radio frequency transmission power as an action space, and establishing a reward function to obtain the offloading parameter;

taking the to-be-computed task of the terminal, the uplink communication channel gain, the sensing pulse response, the angle difference between the communication beam and the sensing beam and the reward function as input, through a reinforcement learning module based on Multi-DQN, to obtain the decision for computation offloading in a task offloading strategy; and taking the to-be-computed task of the terminal, the uplink communication channel gain, the sensing pulse response, the angle difference between the communication beam and the sensing beam and the reward function as input, through a reinforcement learning module based on TD3, to obtain the decision for radio frequency transmission power in the task offloading strategy.

* * * * *